United States Patent

Bortolin et al.

[11] Patent Number: 5,102,968
[45] Date of Patent: Apr. 7, 1992

[54] METHOD OF MAKING SILETHYNYL-SILOXANE COPOLYMERS

[75] Inventors: Roberto Bortolin, Barry; Scott S. Brown, Newhaven, both of United Kingdom; Bhukandas Parbhoo, Midland, Mich.

[73] Assignee: Dow Corning Limited, Barry, Wales

[21] Appl. No.: 550,913

[22] Filed: Jul. 11, 1990

[30] Foreign Application Priority Data

Jul. 28, 1989 [GB] United Kingdom ............... 8917329.8

[51] Int. Cl.$^5$ .............................................. C08G 77/06
[52] U.S. Cl. ........................................ 528/14; 528/18; 528/37
[58] Field of Search ............................. 528/37, 14, 18

[56] References Cited

U.S. PATENT DOCUMENTS

| | | | |
|---|---|---|---|
| 2,671,100 | 3/1952 | Frisch | 260/448.2 |
| 3,974,120 | 8/1976 | Razzano | 260/30.4 |
| 4,066,153 | 9/1989 | Bartolin | 528/32 |
| 4,585,669 | 4/1986 | Eckberg | 528/15 |
| 4,800,221 | 1/1989 | Marko | 528/32 |
| 4,839,452 | 6/1989 | Kurita et al. | 528/32 |
| 4,866,153 | 9/1989 | Bortolin et al. | 528/32 |
| 4,923,949 | 5/1990 | Iwahara et al. | 528/33 |

OTHER PUBLICATIONS

Yarosch et al., CA112 (ii) 98624k.
Sakurai, J. Am. Chem. Soc., 106, 8315-16 (1984).
Nauvkssr, CA 90(1) 6456h (Voronkov et al.).
Nauvkssr, CA 77(13), 88589x (Komarov et al.).
Azerbaer CA 82 (23) 1564376.

*Primary Examiner*—Melvyn I. Marquis
*Attorney, Agent, or Firm*—Roger E. Gobrogge

[57] ABSTRACT

A method of making silethynyl-siloxane copolymers having $R_2SiC\equiv C$ units and $R_2SiO$ units wherein each R denotes H or a $C_{1-16}$ hydrocarbon or substituted hydrocarbon group, comprises ring-opening copolymerization in the presence of a catalytic amount of a lithium compound, of cyclic siloxanes and cyclic silethynyl polymers. Novel silethynyl-siloxane copolymers of the formula

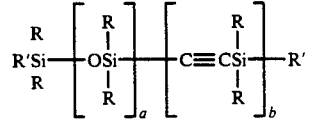

are also disclosed wherein R' denotes $-C\equiv CH$ or R and a and b are at least 1.

6 Claims, No Drawings

METHOD OF MAKING SILETHYNYL-SILOXANE COPOLYMERS

This invention relates to polymers, more particularly linear copolymers which consist of silethynyl units and siloxane units and also to a method of making them.

Some silethynyl-siloxane copolymers are known and have been described in an article by P. Jones in the proceedings of the 8th International Symposium on Silicon Chemistry, A36, June 1987, St. Louis, Mis. These were cyclic copolymers having 2 or 3 units of the formula $[(CH_3)_2SiO-(CH_3)_2SiC\equiv C]$. These cyclic copolymers were prepared by condensation of bis(methoxydimethylsilyl) acetylene catalysed by HBr. The resulting copolymers have a ratio of siloxane units to silethynyl units of 1/1.

Due to the interesting characteristics of copolymers having acetylenic unsaturation, it is desirable to find a method which allows the production of a wider variety of such copolymers. It is desirable e.g. to make linear copolymers and also to make copolymers in which the ratio of siloxane units to silethynyl units can be varied.

We have now found that the copolymers of the invention may be made by base-catalysed ring-opening reaction of cyclic siloxane and cyclic silethynyl polymers. This method is capable of producing linear copolymers and cyclic copolymers having siloxane units and silethynyl units. Generally mixtures of linear and cyclic copolymers are produced by this method. The method is capable of making random copolymers or block copolymers.

According to the invention there is provided a method of making silethynyl-siloxane copolymers having at least one unit of the formula $R_2Si(C\equiv C)$ and at least one unit of the formula $R_2SiO$ wherein each R independently denotes a hydrogen atom, a hydrocarbon group having up to 16 carbon atoms or a substituted hydrocarbon group, which comprises ring-opening copolymerisation, in the presence of a catalytic amount of a lithium compound, of cyclic siloxanes of the formula $[R_2SiO]_n$ and cyclic silethynyl polymers of the formula $[R_2SiC\equiv C]_m$ wherein R is as defined above and n and m denote integers with a value of at least 3.

The starting reagents for the method are known materials. Cyclic siloxanes have been known for a long time and several are commercially available. The R substituent may be for example hydrogen, alkyl, aryl, alkenyl, aralkyl or alkaryl. Examples of such substituents include methyl, ethyl, propyl, isobutyl, phenyl, vinyl, allyl, tolyl and phenylethyl. Preferably at least 80% of all R groups are lower alkyl or aryl groups, most preferably methyl or phenyl. A preferred cyclic siloxane is hexamethyl trisiloxane.

Cyclic silethynyl polymers are also known and have been described for example in G.B. patent application 2 204 041. These materials are prepared e.g. by the reaction of a lithium salt of one or more diethynylsilanes with one or more dihalosilanes. Examples of the R substituent and their preferred nature is as described for the cyclic siloxanes.

The lithium compound used in the method of the invention may be an organolithium compound, a lithium silanolate or a lithium salt of a diethynylsilane. Preferred materials are butyl lithium, methyl lithium, $(C_6H_5)_2Si(OLi)_2$, $Me_2Si(C\equiv CLi)_2$ or $Ph_2Si(C\equiv CLi)_2$ wherein Me and Ph respectively denote a methyl group and a phenyl group.

The method of the present invention has the advantage over normal condensation methods that it is capable of producing copolymers of siloxane and silethynyl units in which the ratio between the different types of units is not limited to 1/1 and can be controlled fairly accurately. Depending on the catalyst chosen the reaction product will also predominantly be either a low molecular weight cyclic material or a relatively high molecular weight linear copolymer. It has been found that organolithium compounds favour the formation of linear copolymers whilst $Ph_2Si(C\equiv CLi)_2$ for example, tends to favour the formation of cyclic copolymers. The molecular weight of the copolymers may range from 500 to 50,000, more typically from 2000 to 6000 Daltons. When producing linear copolymers the molecular weight of the copolymers can be controlled to some extent by the addition of endblocking compounds to the reaction mixture. Such endblocking compounds may be monofunctional silane compounds of the formula $R_3SiX$ wherein R is as defined above and X may be a halogen or hydroxyl group. Examples of such endblocking compounds include trimethylchlorosilane, phenyldimethylchlorosilane, trimethylsilanol and vinyldimethylchlorosilane. Such silanes, especially those where X is a halogen, would be added at the end of the reaction in order to quench the catalyst. Other endblocking compounds which may be used include short chain siloxanes of the formula $R_3Si[OSi(R)_2]_aR$ in which a has a value of from 1 to 5. These short chain siloxanes are preferably added with the reagents at the beginning of the reaction in order to control the molecular weight of the copolymers. However, if the ratio of cyclic silethynyl polymers to cyclic siloxanes is high there is an increased possibility that linear copolymers are endblocked with $-SiR_2R'$ units wherein $R'$ has the formula $-C\equiv CH$.

The reaction may be carried out in the presence of a solvent, which may be a solvent for any of the starting compounds and is preferably an ether or a hydrocarbon solvent e.g. diethyl ether, tetrahydrofuran, hexane, toluene or xylene. The reaction is preferably carried out at room temperature but increased temperatures are also possible.

The reaction product of the method of the invention is a copolymer which may be linear or cyclic. Cyclic copolymers wherein all R groups are methyl groups produced by this method generally have a molecular weight of up to 1000 giving copolymers with up to silicon atoms per molecule. Copolymers produced by the method of the invention may range from liquid to solid materials.

Linear silethynyl-siloxane copolymers are believed to be new and are therefore included in the scope of the present invention.

According to another aspect of the invention there is provided a silethynylsiloxane copolymer having the general formula

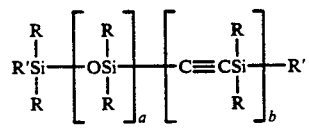

in which each R independently denotes a hydrogen atom, a hydrocarbon group or a substituted hydrocarbon group having up to 16 carbon atoms, R' denotes a group —C≡CH or a group R and a and b are integers, which may be the same or different, each having a value of at least 1.

The copolymers of the invention may be low molecular weight materials or relatively high molecular weight copolymers in which the siloxane units and silethynyl units are alternating or randomly distributed in the copolymers. The molecular weight of the copolymers may range from 500 to 50,000, typically from 1000 to 10,000 Daltons. The R substituent of the copolymers may be for example hydrogen, alkyl, aryl, alkenyl, aralkyl or alkaryl. Examples of such substituents include methyl, ethyl, propyl, isobutyl, phenyl, vinyl, allyl, tolyl and phenylethyl. Preferably at least 80% of all R groups are lower alkyl or aryl groups, most preferably methyl or phenyl. The endblocking units of the copolymers of the invention may be any group of the formula —SiR$_2$R', wherein R' is preferably an R group. Terminal units include trimethylsilyl, ethynyldimethylsilyl, phenyldimethylsilyl, methylphenylethynylsilyl and vinyldimethylsilyl groups. The endblocking units may be bonded to the chain via siloxane bonds (SiOSi) or via silethynyl bonds (SiC≡CSi).

Because of the presence of the acetylene groups in the siloxane chain, copolymers of the invention and copolymers made according to the method of the invention will have a higher Tg value whilst retaining thermal stability. Due to the presence of the unsaturation the copolymers may be useful as intermediates e.g. for further addition reaction with compounds having silicon-bonded hydrogen atoms.

There now follow a number of examples in which all parts and percentages are by weight unless otherwise indicated and in which Me denotes a methyl group.

EXAMPLE 1

0.4 g (5.4 mmole) of hexamethyl trisiloxane and 1.35 g (16.5 mmole) of (Me$_2$SiC≡C)$_n$ wherein n denotes on average a value of 5 or 6, were placed in a flask which was consequently purged with nitrogen. 50 ml of tetrahydrofuran was added and the solution stirred whilst a solution of (C$_6$H$_5$)$_2$Si(C≡CLi)$_2$ was added to give a concentration of 1 mole % by weight of the catalyst based o the total weight of the reactants. The mixture was stirred at ambient temperature for 16 hours after which 1 ml of trimethylchlorosilane was added to stop the reaction. The solution was neutralised with sodium carbonate and then filtered. The tetrahydrofuran was removed from the filtrate under reduced pressure to give a brown oil. LiCl was removed by redissolving the product in dichloromethane and passing the solution through a short chromotography column. Evaporation of the solvent from the collected fraction yielded a pale brown, waxy solid which was analysed by infrared spectroscopy and C$^{13}$ and Si$^{29}$ nuclear magnetic resonance spectroscopy and was found to be a mixture of linear and cyclic copolymers wherein the ratio of dimethylsiloxane units to dimethylsilethynyl units is about 1/1 and in which the units are randomly distributed in the copolymer.

EXAMPLE 2

The procedure of Example 1 was repeated except that 1.11 g of hexamethyl trisiloxane and 1.25 g of (Me$_2$SiC≡C)$_n$ were used. The finished product was found to be a mixture of linear and cyclic copolymers wherein the ratio of dimethylsiloxane units to dimethylsilethynyl units is about 3/1 and in which the units are randomly distributed in the copolymer.

EXAMPLE 3

The procedure of Example 1 was repeated except that 0.28 g of hexamethyl trisiloxane and 1.04 g of (Me$_2$SiC≡C)$_n$ were used. The finished product was found to be a mixture of linear and cyclic copolymers wherein the ratio of dimethylsiloxane units to dimethylsilethynyl units is about ⅓ and in which the units are randomly distributed in the copolymer.

Which is claimed is:

1. A method of making silethynyl-siloxane copolymers having at least one unit of the general formula R$_2$SiC≡C and at least one unit of the general formula R$_2$SiO wherein each R is independently selected from the group consisting of hydrogen, hydrocarbon groups having up to 16 carbon atoms and substituted hydrocarbon groups having up to 16 carbon atoms, which comprises reacting a catalytic amount of a lithium compound with a cyclic siloxane of the formula (R$_2$SiO)$_n$ and a cyclic silethynyl polymer of the formula (R$_2$SiC≡C)$_m$ wherein R is as defined above and n and m denote integers which have a value of at least 3.

2. A method according to claim 1 wherein at least 80% of all the R groups in the cyclic siloxane and in the cyclic silethynyl copolymer are selected from the group consisting of lower alkyl groups and aryl groups.

3. A method according to claim 1 wherein the cyclic siloxane is hexamethyltrisiloxane.

4. A method according to claim 1 in which the cyclic silethynyl polymer is a cyclic polydimethylsilethynyl polymer.

5. A method according to claim 1 in which the lithium compound is selected from the group consisting of butyl lithium, methyl lithium, (C$_6$H$_5$)$_2$Si(OLi)$_2$, (CH$_3$)$_2$Si(C≡CLi)$_2$ and (C$_6$H$_5$)$_2$Si(C≡CLi)$_2$.

6. A method according to claim 1 which is carried out in the presence of a solvent which is selected from the group consisting of ether solvents and hydrocarbon solvents.

* * * * *